United States Patent
Aibara

(10) Patent No.: US 9,639,970 B2
(45) Date of Patent: May 2, 2017

(54) CHARACTER RECOGNITION SYSTEM, CHARACTER RECOGNITION PROGRAM AND CHARACTER RECOGNITION METHOD

(71) Applicant: FINDEX Inc., Matsuyama-shi Ehime (JP)

(72) Inventor: Teruo Aibara, Matsuyama Ehime (JP)

(73) Assignee: FINDEX Inc., Matsuyama-shi Ehime (JP)

( * ) Notice: Subject to any disclaimer, the term of this patent is extended or adjusted under 35 U.S.C. 154(b) by 22 days.

(21) Appl. No.: 14/826,163

(22) Filed: Aug. 13, 2015

(65) Prior Publication Data

US 2015/0356764 A1 Dec. 10, 2015

Related U.S. Application Data

(63) Continuation-in-part of application No. PCT/JP2013/059508, filed on Mar. 29, 2013.

(30) Foreign Application Priority Data

Feb. 13, 2013 (JP) .................................. 2013-025232

(51) Int. Cl.
  *G06T 11/60* (2006.01)
  *G06K 9/68* (2006.01)
  (Continued)

(52) U.S. Cl.
  CPC ............... *G06T 11/60* (2013.01); *G06K 9/18* (2013.01); *G06K 9/342* (2013.01); *G06K 9/344* (2013.01);
  (Continued)

(58) Field of Classification Search
  CPC ....... G06K 9/342; G06K 9/344; G06K 9/6828
  See application file for complete search history.

(56) References Cited

U.S. PATENT DOCUMENTS 5,781,914 A * 7/1998 Stork ................. G06K 9/00442
  715/234
6,151,423 A * 11/2000 Melen .................. G06K 9/3208
  382/289

(Continued)

FOREIGN PATENT DOCUMENTS

JP 63-106882 A 5/1988
JP 3-214377 A 9/1991
(Continued)

OTHER PUBLICATIONS (IPEA/409) International Preliminary Report on Patentability Chapter II and (IPEA/409) English Translation of International Preliminary Report on Patentability Chapter II for WO2014125658 downloaded from WIPO Patentscope having document date Aug. 13, 2015.*

(Continued)

*Primary Examiner* — Jeffery A Brier
(74) *Attorney, Agent, or Firm* — JTT Patent Services, LLC; Gerald T. Peters

(57) ABSTRACT

A character recognition system for recognizing character(s) displayed on display(s) of computer(s). In one embodiment, memory device(s) store recognition dictionaries, and there may be a separate recognition dictionary for each display font and character size combination. Such a recognition dictionary may contain information pertaining to arrangement of constituent dots making up each character of a corresponding display font and character size. A character recognition unit may identify target character(s) displayed on display(s) by searching such recognition dictionary or dictionaries and extracting therefrom character(s) for which information pertaining to arrangement of constituent dots making up extracted character(s) is a perfect match for target character(s) displayed on display(s).

20 Claims, 4 Drawing Sheets

(51) Int. Cl.
G06K 9/18 (2006.01)
G09G 5/39 (2006.01)
G06T 1/60 (2006.01)
G06K 9/34 (2006.01)

(52) U.S. Cl.
CPC .............. *G06K 9/6828* (2013.01); *G06T 1/60* (2013.01); *G09G 5/39* (2013.01)

(56) References Cited

U.S. PATENT DOCUMENTS

| | | | | |
|---|---|---|---|---|
| 6,473,517 | B1* | 10/2002 | Tyan | G06K 9/344 382/105 |
| 2008/0294431 | A1* | 11/2008 | Miyamoto | G10L 15/26 704/231 |
| 2008/0310721 | A1* | 12/2008 | Yang | G06K 9/3275 382/182 |
| 2008/0310722 | A1* | 12/2008 | Daniels | G06K 9/00 382/182 |
| 2010/0195123 | A1* | 8/2010 | Fujioka | G06F 3/1207 358/1.9 |
| 2010/0215276 | A1* | 8/2010 | Suwa | G06K 9/342 382/218 |

FOREIGN PATENT DOCUMENTS

| | | | |
|---|---|---|---|
| JP | 9-22442 A | | 1/1997 |
| JP | 9-81671 A | | 3/1997 |
| JP | 11-96289 A | | 4/1999 |
| JP | 2008071214 A | * | 3/2008 |

OTHER PUBLICATIONS

International Search Report (ISR) dated May 14, 2013 in International Application (IA) No. PCT/JP2013/059508 filed Mar. 29, 2013 (published as WO/2014/125658 A1 on Aug. 21, 2014), of which the present application is a bypass continuation-in-part.
Written Opinion (WrOp) of International Searching Authority (ISA) dated May 14, 2013 in International Application (IA) No. PCT/JP2013/059508 filed Mar. 29, 2013 (published as WO/2014/125658 A1 on Aug. 21, 2014), of which the present application is a bypass continuation-in-part. Same references and cited locations as in ISR at NPL Cite No. 1, so cumulative thereto and no further translation or summary required per MPEP 609.04(a).III.
Written Opinion (WrOp) of International Preliminary Examining Authority (IPEA) dated Feb. 17, 2015 in International Application (IA) No. PCT/JP2013/059508 filed Mar. 29, 2013 (published as WO/2014/125658 A1 on Aug. 21, 2014), of which the present application is a bypass continuation-in-part. Same references and cited locations as in IPRP at NPL Cite No. 4, so cumulative thereto and no further translation or summary required per MPEP 609.04(a).III.
International Preliminary Report on Patentability (IPRP) dated May 8, 2015 in International Application (IA) No. PCT/JP2013/059508 filed Mar. 29, 2013 (published as WO/2014/125658 A1 on Aug. 21, 2014), of which the present application is a bypass continuation-in-part.
English translation of relevant portion of Written Opinion (WrOp) issued by the International Preliminary Examining Authority (IPEA) on Feb. 17, 2015 in International Application (IA) No. PCT/JP2013/059508 filed Mar. 29, 2013 (published as WO/2014/125658 A1 on Aug. 21, 2014), of which the present application is a bypass continuation-in-part. Same references and cited locations as in IPRP at NPL Cite No. 4 of IDS of Oct. 21, 2015, so thought to be cumulative thereto; nonetheless, this partial English translation being submitted in a abundance of caution.
Extended European Search Report including Supplementary European Search Report and European Search Opinion, all dated Aug. 16, 2016, in EP Application No. 13875167, which is the EU regional stage of International Application No. PCT/JP2013/059508 filed Mar. 29, 2013 (published as WO/2014/125658 A1 on Aug. 21, 2014), of which the present application is a bypass continuation-in-part.
Xianli Wu et al: "A recognition algorithm for chinese characters in diverse fonts", International Conference on Image Processing (ICIP), IEEE, vol. 3, Sep. 22, 2002 (Sep. 22, 2002), pp. 981-984, XP010607884, DOI: 10.1109/ICIP.2002.1039139 ISBN: 978-0-7803-7622-9.
Min-Chul Jung et al: "Multifont classification using typographical attributes", Document Analysis and Recognition, 1999. ICDAR '99. Proceedings of the Fifth International Conference on Bangalore, India Sep. 20-22, 1999, Los Alamitos, CA, USA, IEEE Comput. Soc, US, Sep. 20, 1999 (Sep. 20, 1999), pp. 353-356, XP010351301, ISBN: 978-0-7695-0318-9.
Nadira Muda et al: "Optical Character Recognition by Using Template Matching (Alphabet)", National Conference on Software Engineering & Computer Systems 2007, Universiti Malaysia Pahang, Aug. 20, 2007 (Aug. 20, 2007), XP055295428, Retrieved from the Internet: URL:http://umpir.ump.edu.my/969/1/NaCSES-2007-086_Optical_Character_Recognition_By_Using_Templ.pdf [retrieved on Aug. 15, 2016].
Zramdini A et al: "Optical Font Recognition from Projection Profiles", Electronic Publishing, Wiley, Chichester, GB, vol. 6, No. 3, Sep. 1, 1993 (Sep. 1, 1993), pp. 249-260, XP002358508, ISSN: 0894-3982 *abstract*, p. 249, section 1 'Introduction'*, *p. 250, section 1.2, first paragraph*,*p. 252, section 3.2*, *p. 256, section 6*.

* cited by examiner

| Dictionary ID | Display Font | Character Size | Character Code | Dot Arrangement within Border | Border Size | Border Position |
|---|---|---|---|---|---|---|
| 0001 | A | 12 | ... | ... | ... | ... |
| 0001 | A | 12 | ... | ... | ... | ... |
| 0001 | A | 12 | ... | ... | ... | ... |
| ... | ... | ... | ... | ... | ... | ... |
| 0002 | A | 11 | ... | ... | ... | ... |
| 0002 | A | 11 | ... | ... | ... | ... |
| 0002 | A | 11 | ... | ... | ... | ... |
| ... | ... | ... | ... | ... | ... | ... |

FIG. 2

CHARACTER RECOGNITION SYSTEM, CHARACTER RECOGNITION PROGRAM AND CHARACTER RECOGNITION METHOD

CROSS-REFERENCE TO RELATED APPLICATION, PRIORITY CLAIMS, AND INCORPORATION BY REFERENCE

This application is a continuation-in-part of and claims benefit under 35 USC 120 and 365(c) to copending International Application No PCT/JP2013/059508, entitled "Character Recognition System, Character Recognition Program and Character Recognition Method", filed 29 Mar. 2013; and further claims benefit of priority under 35 USC 119(a)-(d) to Japanese Patent Application No 2013-025232, entitled "Character Recognition System, Character Recognition Program, and Character Recognition Method", filed 13 Feb. 2013, the contents of both of which applications are incorporated herein in their entireties by reference.

FIELD OF THE INVENTION

The present invention relates to a character recognition system.

BACKGROUND

Optical character recognition systems for optical capture and recognition of characters printed on paper have been provided conventionally.

There is also demand for recognition by way of image data such as might take place through screen capture of characters displayed on a display of a computer for transfer of data between or among systems and/or application.

However, because dot resolution of characters displayed on a display is coarser than that of characters printed on paper, where conventional optical character recognition techniques have been employed for recognition of characters displayed on a display this has sometimes caused a sharp decline in recognition rate. Particularly where small characters have been employed to increase the amount of data displayed, character recognition rate has been extremely low.

There is therefore a need for a character recognition system such as would permit characters displayed on a display of a computer to be recognized with a high success rate.

SUMMARY OF INVENTION

One embodiment in accordance with one aspect of the present invention is a character recognition system for recognition of at least one first character. The at least one first character may be of at least one first display font and at least one first character size. The at least one first character may have at least one first arrangement of constituent dots making up the at least one first character. The at least one first character may be displayed on at least one display of at least one computer.

The character recognition system may comprise at least one storage device that stores at least one first recognition dictionary having information pertaining to at least one second arrangement of constituent dots making up at least one second character of at least one second display font and at least one second character size.

The character recognition system may further comprise at least one character recognition unit that searches the at least one first recognition dictionary and identifies the at least one first character by performing at least one first comparison to determine whether the at least one first recognition dictionary contains at least one third character for which information pertaining to at least one third arrangement of constituent dots making up the at least one third character is a perfect match for the at least one first arrangement of constituent dots making up the at least one first character displayed at the at least one display.

The character recognition system may further comprise at least one font check unit. The at least one font check unit may carry out screen capture to obtain, from at least one video memory, image data pertaining to the at least one first character displayed at the at least one display. The at least one font check unit may obtain the at least one first display font and the at least one first character size of the at least one first character by performing at least one second comparison to determine whether there is a perfect match with information pertaining to the at least one first arrangement of constituent dots making up the at least one first character. In such an embodiment, the at least one character recognition unit may carry out screen capture to obtain, from the at least one video memory, image data pertaining to the at least one first character displayed at the display, in which case the at least one first recognition dictionary that is searched by the at least one character recognition unit may be the at least one first recognition dictionary which corresponds to the at least one first display font and the at least one first character size that were obtained by the font check unit.

The character recognition system may further comprise at least one dictionary creation unit that creates the at least one first recognition dictionary by obtaining the information pertaining to the at least one second arrangement of constituent dots making up the at least one second character as the at least one second character of the at least one second display font and the at least one second character size are sequentially displayed by way of at least one video memory. In an embodiment in which the character recognition system comprises at least one font check unit, the at least one first recognition dictionary that is created by the at least one dictionary creation unit may be the at least one first recognition dictionary which corresponds to the at least one first display font and the at least one first character size that were obtained by the font check unit.

The at least one character recognition unit may carry out character recognition by identifying the at least one first display font and the at least one first character size of the at least one first character, and by thereafter searching only the at least one first recognition dictionary which corresponds to the at least one first display font and the at least one first character size that were identified.

The identification of the at least one first display font and the at least one first character size of the at least one first character may be carried out by searching at least one second recognition dictionary. The at least one second recognition dictionary may be a subset of, and may have information pertaining to less characters than, the at least one first recognition dictionary.

The at least one second recognition dictionary may contain records for substantially all sizes of all fonts installed on the at least one computer but only for check characters.

In one embodiment, the at least one second recognition dictionary contains records for not more than five check characters.

The information pertaining to the at least one first arrangement of constituent dots may be information pertaining to positions for arrangement of dots within at least one first rectangular border containing all constituent dots making up the at least one first character. The information pertaining to the at least one second arrangement of constituent dots may be information pertaining to positions for arrangement of dots within at least one second rectangular border containing all constituent dots making up the at least one second character. The information pertaining to the at least one third arrangement of constituent dots may be information pertaining to positions for arrangement of dots within at least one third rectangular border containing all constituent dots making up the at least one third character.

The at least one first rectangular border may be a smallest rectangular border which contains all constituent dots making up the at least one first character. The at least one second rectangular border may be a smallest rectangular border which contains all constituent dots making up the at least one second character. The at least one third rectangular border may be a smallest rectangular border which contains all constituent dots making up the at least one third character.

The obtaining of the information pertaining to the at least one second arrangement of constituent dots making up the at least one second character may be accomplished by screen capture from the at least one video memory.

The at least one second display font and the at least one second character size within the at least one first recognition dictionary may include substantially all sizes of all fonts installed on the at least one computer.

The at least one first recognition dictionary may comprise at least one record stored in at least one database.

The at least one record may contain information specifying at least one dictionary identifier, the at least one second display font, the at least one second character size, at least one character code, at least one dot arrangement within at least one border, at least one border size, and at least one border position.

The at least one first comparison may include an operation in which at least one third border size of the at least one third character is compared with at least one first border size of the at least one first character.

The at least one first comparison may include an operation in which at least one third border position of the at least one third character is compared with at least one first border position of the at least one first character.

One embodiment in accordance with another aspect of the present invention is a non-transitory computer-readable medium containing at least one character recognition program. The at least one character recognition program may be capable of causing at least one first character to be recognized by at least one computer. The at least one first character may be of at least one first display font and at least one first character size. The at least one first character may have at least one first arrangement of constituent dots making up the at least one first character. The at least one first character may be displayed on at least one display.

The at least one character recognition program may cause the at least one computer to carry out recognition dictionary creation. This recognition dictionary creation may be such that at least one first recognition dictionary is created. The at least one first recognition dictionary may have information pertaining to at least one second arrangement of constituent dots making up at least one second character of at least one second display font and at least one second character size.

The at least one character recognition program may also cause the at least one computer to carry out character recognition. This character recognition may be such that the at least one first recognition dictionary is searched, and the at least one first character is identified by performing at least one first comparison to determine whether the at least one first recognition dictionary contains at least one third character for which information pertaining to at least one third arrangement of constituent dots making up the at least one third character is a perfect match for the at least one first arrangement of constituent dots making up the at least one first character displayed at the at least one display.

The at least one character recognition program may further cause the at least one computer to carry out font checking. The font checking may be such that screen capture is carried out to obtain, from at least one video memory, image data pertaining to the at least one first character displayed at the at least one display. The font checking may further be such that the at least one first display font and the at least one first character size of the at least one first character are obtained by performing at least one second comparison to determine whether there is a perfect match with information pertaining to the at least one first arrangement of constituent dots making up the at least one first character. Where such font checking is carried out, the character recognition may be such that screen capture is carried out to obtain, from the at least one video memory, image data pertaining to the at least one first character displayed at the display. Where such font checking is carried out, the at least one first recognition dictionary that is searched during the character recognition may be the at least one first recognition dictionary which corresponds to the at least one first display font and the at least one first character size that were obtained during the font checking.

One embodiment in accordance with yet another aspect of the present invention is a character recognition method. The character recognition method may be for recognizing at least one first character. The at least one first character may be of at least one first display font and at least one first character size. The at least one first character may have at least one first arrangement of constituent dots making up the at least one first character. The at least one first character may be displayed on at least one display of at least one computer.

The character recognition method may comprise recognition dictionary creation. This recognition dictionary creation may be such that at least one first recognition dictionary is created. The at least one first recognition dictionary may have information pertaining to at least one second arrangement of constituent dots making up at least one second character of at least one second display font and at least one second character size.

The character recognition method may further comprise character recognition. This character recognition may be such that the at least one first recognition dictionary is searched, and such that at least one first character is identified by performing at least one first comparison to determine whether the at least one first recognition dictionary contains at least one third character for which information pertaining to at least one third arrangement of constituent dots making up the at least one third character is a perfect match for the at least one first arrangement of constituent dots making up the at least one first character displayed at the at least one display.

The character recognition method may further comprise font checking. The font checking may be such that screen capture is carried out to obtain, from at least one video memory, image data pertaining to the at least one first character displayed at the at least one display. The font checking may further be such that the at least one first display font and the at least one first character size of the at least one first character are obtained by performing at least one second comparison to determine whether there is a perfect match with information pertaining to the at least one first arrangement of constituent dots making up the at least one first character. Where such font checking is carried out, the character recognition may be such that screen capture is carried out to obtain, from the at least one video memory, image data pertaining to the at least one first character displayed at the display. Where such font checking is carried out, the at least one first recognition dictionary that is searched during the character recognition may be the at least one first recognition dictionary which corresponds to the at least one first display font and the at least one first character size that were obtained during the font checking.

Some embodiments of the present invention make it possible to carry out highly accurate character recognition even for characters of low resolution which are displayed at a display of a computer.

Other embodiments, systems, methods, and features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 2 is a drawing showing the content of a recognition dictionary associated with an embodiment of the present invention.

DETAILED DESCRIPTION

Below, character recognition systems which are embodiments of the present invention are described in detail with reference to the drawings.

Figure 1:
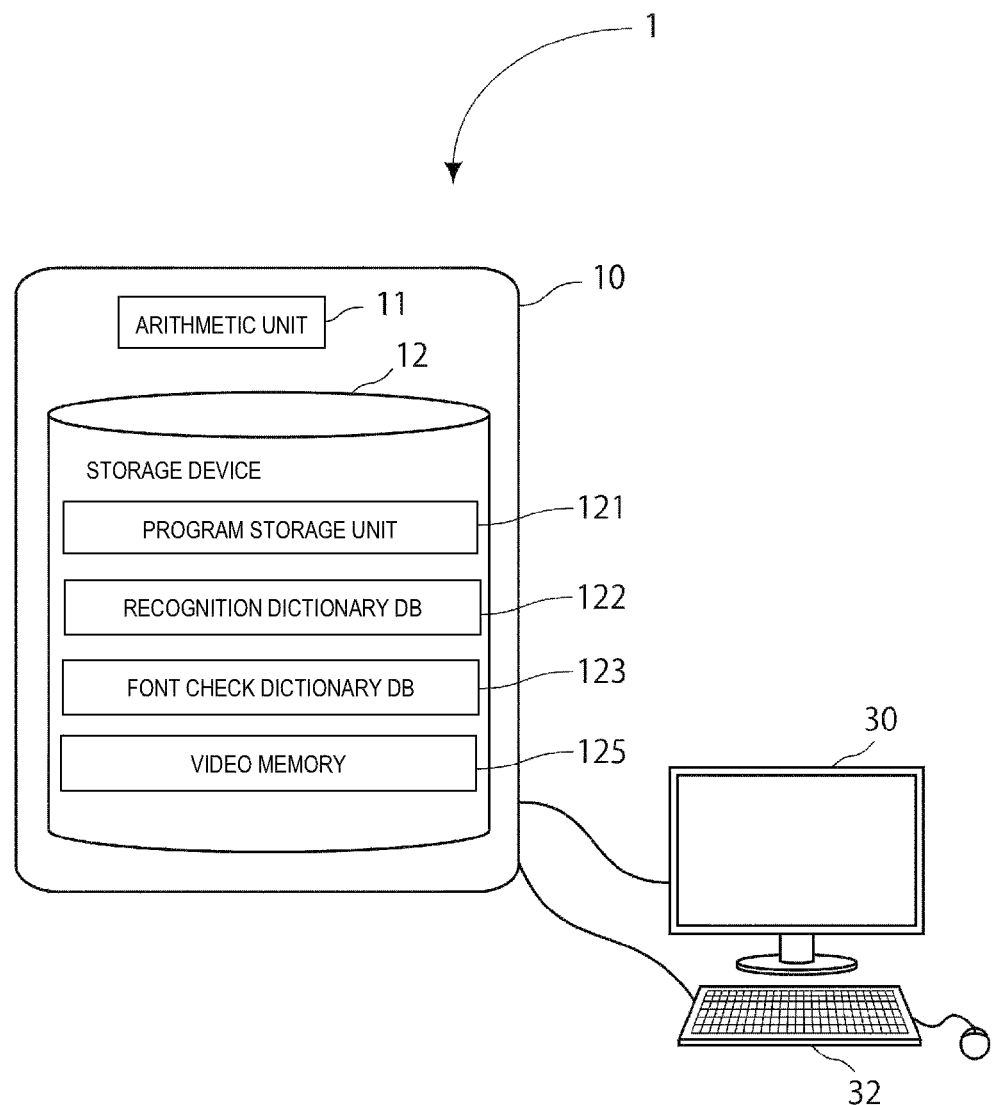
FIG. 1 is a schematic diagram showing in simplified fashion the constitution of a character recognition system associated with an embodiment of the present invention.
Figure 3:
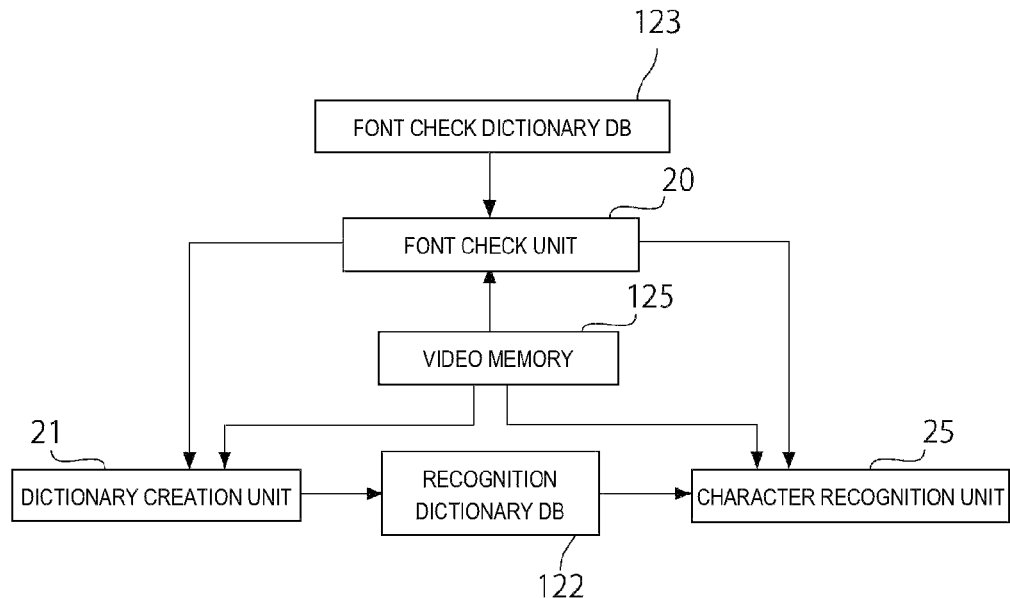
FIG. 3 is a block diagram showing in simplified fashion the functionalities at a character recognition system associated with an embodiment of the present invention.

FIG. 1 is a schematic diagram showing in simplified fashion the constitution of a character recognition system associated with one embodiment. FIG. 2 is a drawing showing the content of a recognition dictionary associated with the present embodiment. FIG. 3 is a block diagram showing in simplified fashion the functionalities at a character recognition system associated with the present embodiment.

As shown in FIG. 1, character recognition system 1 is provided with at least one computer body 10, at least one display 30 which is a display device that displays information output from computer body 10, and input device 32 comprising keyboard(s), mouse(s), and/or the like for causing information to be input to the at least one computer body 10.

Character recognition system 1 associated with the present embodiment is a system for recognition of character(s) displayed at display(s) 30. In the present embodiment, character recognition is performed not by carrying out optical recognition of character(s) but by carrying out identification of character(s) based on whether information pertaining to arrangement of constituent dot(s) making up character(s) is a perfect match.

Hereinbelow, description of the present embodiment is carried out in terms of an example in which recognition is carried out with respect to characters displayed at a prescribed recognition target region within a window displayed at display 30 by an application A.

Computer body 10 is equipped with central processing unit(s) (CPU) or other such arithmetic unit(s) 11 for carrying out various types of operations, as well as hard disc drive(s) (HDD) for storing various types of information, and/or random access memory or memories (RAM) capable of being used as a work area during arithmetic processing, or other such storage device(s) 12.

Storage device 12, which may include non-transitory computer-readable medium or media, is provided with program storage unit(s) 121 for storing OS(es) (operating system(s)), character recognition program(s), recognition dictionary creation program(s), font check program(s), application A, and various other programs installed at computer body 10; recognition dictionary database(s) 122 for storing recognition dictionary or dictionaries used when performing character recognition; font check dictionary database(s) 123 for carrying out font checking; and video memory or memories 125 for temporarily storing content of screen(s) displayed at display(s) 30.

Here, a character recognition program is a program for carrying out execution of processing for character recognition, described below. A recognition dictionary creation program is a program for carrying out execution of processing for recognition dictionary creation, described below. Furthermore, a font check program is a program for obtaining information pertaining to display font(s) and character size(s) of recognition target character(s) during recognition dictionary creation and/or character recognition.

Recognition dictionary database 122 stores recognition dictionaries. In accordance with one embodiment, a separate recognition dictionary is created for each display font and character size combination. In one embodiment, recognition dictionary database 122 stores a separate recognition dictionary for each display font and character size combination. As used herein, "separate" in the context of storage and/or retrieval of records within a database means that records are identifiable so as to permit extraction based on certain criteria.

Recognition dictionary content may be organized within recognition dictionary database 122 in units of recognition dictionary record(s). Recognition dictionary content in accordance with one embodiment will now be described with reference to FIG. 2. In the embodiment shown at FIG.

2, each row under the top header row may be considered a record. In the present embodiment, each record within recognition dictionary database 122 may comprise the following items: "dictionary ID", "display font", "character size", "character code", "dot arrangement within border", "border size", and "border position".

The "dictionary ID" identifies the recognition dictionary to which the record belongs. "Display font", "character size", and "character code" are the display font, character size, and character code of the character for which the record in question was created.

In an embodiment in which recognition dictionary database 122 stores a separate recognition dictionary for each display font and character size combination, records for different characters of the same character size and the same display font might have the same dictionary ID. For example, at FIG. 2, the three records shown as having dictionary ID 0001 might be records for three different characters (e.g., the characters "a", "b", and "c", with character codes as defined by the ASCII, JIS, or other such character code scheme) of the same character size (e.g., character size "12") and the same display font (e.g., font "A"). In accordance with such an embodiment, identifiers of recognition dictionary records are mutually identical when the recognition dictionary records are for the same display font and character size combination, i.e., when they are records for characters of the same display font and the same character size (as is the case for the three records having dictionary ID 0001 shown in FIG. 2), and identifiers of recognition dictionary records are mutually different when at least one of the display font and the character size of the recognition dictionary records is different (e.g., the three records shown as having dictionary ID 0001 at FIG. 2 are for characters of character size "12" while the three records shown as having dictionary ID 0002 are for characters of character size "11").

"Dot arrangement within border" is information pertaining to position(s) for arrangement of dots within the smallest rectangular border containing all constituent dots making up the character for which the dictionary in question was created. For example, if locations where black dots are arranged are indicated by "1", and location of blank spaces where black dots are not arranged are indicated by "0", this might be such that each row as one proceeds from the upper left to the lower right within the rectangular border is stored in the format "00110101110000".

"Border size" is information pertaining to the vertical and horizontal sizes (numbers of dots) of the aforementioned smallest rectangular border. "Border position" is the distance from the baseline (bottommost line which serves as reference) to the bottom of the aforementioned smallest rectangular border. In accordance with the present embodiment, the items "dot arrangement within border", "border size", and "border position" correspond to information pertaining to arrangement of constituent dots making up the character in question.

Font check dictionaries stored within font check dictionary database 123 are dictionaries for obtaining information pertaining to display font(s) and character size(s) of recognition target character(s) during recognition dictionary creation or character recognition. The same information that the foregoing recognition dictionaries have for all sizes of all fonts installed on computer body 10, font check dictionaries have as well, except that font check dictionaries only have information for a smallnumber of prescribed check characters; e.g., a e i o u, or the like.

Next, functionalities of character recognition system 1 will be described with reference to FIG. 3. As shown in same drawing, character recognition system 1 is provided with font check unit 20 having functionality for recognizing display font(s) and character size(s) of character(s) displayed at display 30; dictionary creation unit 21 having functionality for creating the aforementioned recognition dictionaries; and character recognition unit 25 having functionality for carrying out character recognition.

The functionalities of these respective units are implemented as a result of execution by arithmetic unit(s) 11 of font check program(s), recognition dictionary creation program(s), and character recognition program(s) within program storage unit(s) 121.

Figure 4:
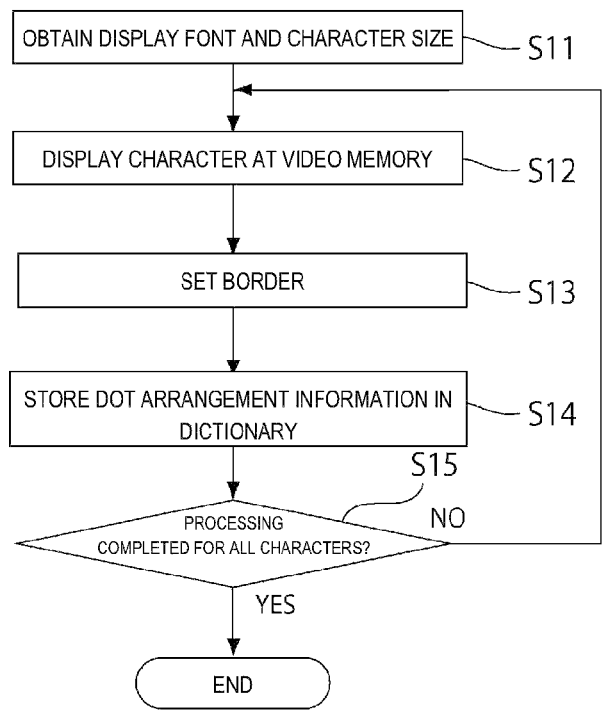
FIG. 4 is a flowchart showing flow of recognition dictionary creation processing associated with an embodiment of the present invention.

Next, flow of processing for creation of recognition dictionaries stored at recognition dictionary database 122 will be described with reference to FIG. 4. FIG. 4 is a flowchart showing flow of recognition dictionary creation processing associated with the present embodiment.

In the present embodiment, recognition dictionary creation is carried out prior to character recognition processing, described below, recognition dictionary or dictionaries being created by dictionary creation unit 21 for the display font and character size combination(s) at recognition target character(s) on which recognition is about to be carried out. Of course, if a recognition dictionary was previously created for the display font and character size combination of a recognition target character, there is no need to create the dictionary again, it being sufficient to use the recognition dictionary that was previously stored.

During recognition dictionary creation, recognition dictionary creation program(s) are executed at computer body 10. First, at S11, the display font and character size of the recognition dictionary which is to be created is obtained. The obtaining of this character size and so forth is carried out by launching font check program(s).

Because the recognition dictionary or dictionaries created here are recognition dictionary or dictionaries for display font and character size combination(s) at recognition target character(s) displayed within prescribed recognition target region(s) within window(s) displayed by application A, font check program(s) can automatically identify display font(s) and character size(s) of such recognition target character(s) by searching font check dictionary or dictionaries stored at font check dictionary database 123.

More specifically, font check unit 20 obtains image data pertaining to recognition target character(s) from video memory 125 by means of screen capture, and searches font check dictionary database 123 to extract therefrom character(s) for which information pertaining to arrangement of constituent dot(s) making up recognition target character(s) is a perfect match. This makes it possible for character(s) having the same font(s) and the same size(s) as the recognition target character(s) to be identified, and allows information pertaining to display font(s) and character size(s) of character(s) displayed at the recognition target region to be obtained.

Note that since this processing for searching of font check dictionary database 123 to extract characters is identical to processing for character recognition, described below, detailed description thereof is omitted. Furthermore, because font check dictionaries are dictionaries for only a small number of check characters, it is necessary that characters be input by an operator in advance or that some other operation be carried out such as will make it possible for such check character(s) to be displayed as recognition target character(s) within recognition target region(s) during font checking.

Unlike conventional optical character recognition, identification of a character is carried out in the present embodiment based on whether information pertaining to positions for arrangement of constituent dots making up the character is a perfect match, the character being identified as a different character if display font and/or character size is different. For this reason, it is necessary that the recognition dictionaries also be such that a separate recognition dictionary is created for each display font and character size combination. Note that where physically possible, it is also permissible for the font check at S11 be carried out manually through configuration procedures performed by a human operator.

Next, processing proceeds to S12, where characters of the display font and character size obtained at S11 are sequentially displayed at display 30 (video memory 125). The characters displayed here are all characters installed at computer body 10 which are of the display font and character size in question. More specifically, while details will vary depending on the display font, this might for example be all characters included in the JIS non-kanji set, JIS level-1 kanji set, and JIS level-2 kanji set.

At S13, when the first character is displayed, setting of the border is carried out. This border is preferably the smallest rectangular border which contains all constituent dots making up the displayed character. Next, at S14, the recognition dictionary record is stored at recognition dictionary database 122. Included in the recognition dictionary record stored at recognition dictionary database 122 is information pertaining to arrangement of dots within the border. More specifically, the content of the recognition dictionary record is the information described above; i.e., "dictionary ID", "display font", "character size", "character code", "dot arrangement within border", "border size", and "border position".

Next, at S15, determination is made as to whether dictionary storage has been completed for all characters of the display font and character size combination in question. If at S15 it is determined that there is/are still character(s) for which storage has not yet been carried out, then processing returns to S12, and the processing at S12 through S14 is repeated, to carry out dictionary storage of the next character. If at S15 it is determined that dictionary storage has been carried out for all characters, then recognition dictionary storage for the display font and character size combination in question is complete.

There is no need for such recognition dictionary creation to be carried out in advance for all character sizes of all display fonts possessed by the OS at computer body 10, it being sufficient to carry out recognition dictionary creation for all characters of the display font and character size combination(s) possessed by the character(s) displayed within the recognition target region(s) at the time that character recognition is carried out.

Figure 5:
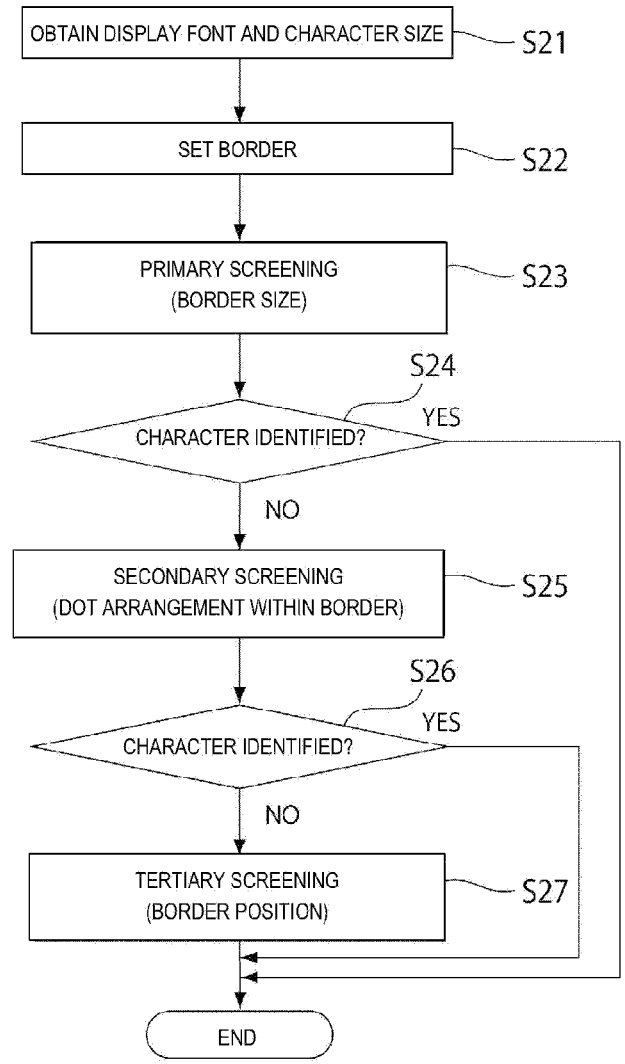
FIG. 5 is a flowchart showing flow of character recognition processing associated with an embodiment of the present invention.
Figure 6:
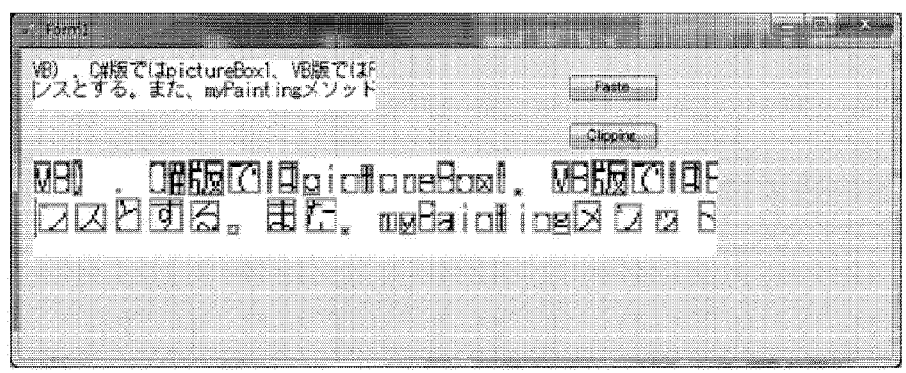
FIG. 6 is a drawing for describing character recognition processing associated with an embodiment of the present invention.

Next, flow of character recognition processing associated with the present embodiment will be described with reference to FIG. 5 and FIG. 6. FIG. 5 is a flowchart showing flow of character recognition processing associated with the present embodiment. FIG. 6 is a drawing for describing character recognition processing associated with the present embodiment.

First, at S21, display font(s) and character size(s) of recognition target character(s) are obtained. The obtaining of such character size(s) and so forth is carried out by launching font check program(s), processing being identical to that described above with reference to S11. Furthermore, where character recognition processing is carried out without interruption following recognition dictionary creation, because display font and character size will already have been obtained at S11, S21 may be omitted.

As a result of obtaining this display font and this character size, it is possible to determine which recognition dictionary among the recognition dictionaries stored at recognition dictionary database 122 should be used for the character recognition which is about to be carried out.

Next, at S22, setting of border(s) for recognition target character(s) is carried out. More specifically, image data pertaining to the recognition target region of application A is obtained from video memory 125, and after division to permit separate processing for each character displayed within the region in question, for each character the smallest rectangular border which contains all of the constituent dots making up that character is set. FIG. 6 shows how the smallest rectangular border for each character has been set.

At S23, filtering of characters based on information pertaining to "border size" (primary screening) is carried out. That is, character(s) having the same border size as the border size which is set for the recognition target character is/are extracted from the recognition dictionary.

Next, at S24, determination is made as to whether a single character was identified based on the screening that was performed at S23. If the result of primary screening was a single character, then because the recognition target character can be identified as that character, character recognition processing is complete.

If it is determined that it was not identified at S24, then processing proceeds to S25, where filtering of characters based on information pertaining to "dot arrangement within border" (secondary screening) is carried out. That is, character(s) having the same dot arrangement position(s) within the border as the arrangement position(s) set for the recognition target character is/are extracted from the characters that were extracted as a result of primary screening.

Next, at S26, determination is made as to whether a single character was identified based on the screening that was performed at S25, character recognition being complete if it was so determined, and processing proceeding to S27 where tertiary screening is carried out if it is not so determined. For example, if the recognition target character is the character "." or the character ",", because these have the same "border size" and the same "dot arrangement within border", processing would proceed to S27. At S27, screening of characters is carried out based on information pertaining to "border position", and the character is identified.

In the event that there are a plurality of characters within the recognition target region, the processing at S23 through S27 may be repeated for each character. Furthermore, during the font check at S21, in the event that there are a plurality of display font and character size combinations within the recognition target region, a plurality of recognition dictionaries may be searched to carry out character recognition.

Furthermore, the order in which the aforementioned screening is carried out may be changed as appropriate. Furthermore, whereas at the foregoing embodiment the smallest rectangular border was set before using "border size", "border position", and "dot arrangement within border" to carry out character recognition, any of various other types of information may be used as "information pertaining to arrangement of dot(s) constituting character(s)" for the purpose of carrying out character recognition, it being possible, for example, to use the number of black dots at the first line within the border, or the like, therefor.

Above, a character recognition system associated with the present embodiment has been described, the present embodiment making it possible to carry out character recognition with a recognition rate of approximately 100% as a result of carrying out recognition of character(s) displayed at display 30 based on information pertaining to arrangement of dot(s) constituting character(s).

The recognition character target(s) associated with the present embodiment being character(s) displayed at display 30 (video memory 125) of computer body 10, because there are no dirty locations or locations of voids as would be the case with characters printed on paper, it is possible to definitively identify character(s) based on information pertaining to dot arrangement.

But because dot arrangement will be different if the display font and/or character size of a character is different, when carrying out character recognition in accordance with the present embodiment it is necessary that display font(s) and character size(s) of recognition target character(s) be ascertained in advance, and that creation of recognition dictionary or dictionaries and execution of character recognition processing be carried out thereafter for the identical display font and character size combination(s).

Furthermore, by employing a plurality of types of information pertaining to arrangement of dot(s) constituting character(s) and carrying out screening in stages as in the present embodiment, it will be possible to achieve reduction in processing load associated with character recognition and to carry out character recognition quickly and with high efficiency.

Next, variations on the present embodiment will be described. First, where character(s) displayed at display 30 are character(s) which have been subjected to antialiasing processing, if prior to carrying out processing for the aforementioned font checking, recognition dictionary creation, character recognition, and the like, dot(s) of other than specified saturation and/or other than specified brightness are subtracted using the same threshold from character image data, it will be possible to carry out character recognition in such fashion as to be unaffected by antialiasing processing.

Furthermore, where character(s) displayed at display 30 are character(s) which have been subjected to underlining, bolding or other such character decoration, if, during recognition dictionary and font check dictionary creation, creation thereof is carried out such that recognition dictionary record(s) for character(s) subjected to the same character decoration are added thereto, it will also be possible to definitively carry out character recognition with respect to decorated characters.

Furthermore, even where half-width character(s) are included thereat, by creating recognition dictionary or dictionaries for half-width character(s), it will be possible to definitively carry out character recognition thereof.

While embodiments of the present invention have been described above, modes of carrying out the present invention are not limited to the foregoing embodiments, a great many further variations being possible without departing from the gist of the present invention. For example, whereas a single computer was used to implement a character recognition system in the foregoing embodiment, this may be implemented such that there is distributed processing by a plurality of computers.

EXPLANATION OF REFERENCE NUMERALS

1 Character recognition system
10 Computer body
11 Arithmetic unit
12 Storage device
121 Program storage unit
122 Recognition dictionary database
123 Font check dictionary database
125 Video memory
20 Font check unit
21 Dictionary creation unit
25 Character recognition unit
30 Display
32 Input device

What is claimed is:

1. A character recognition system for recognition of at least one first character, of at least one first display font and at least one first character size and having at least one first arrangement of constituent dots making up the at least one first character, displayed on at least one display of at least one computer, the character recognition system comprising:
   at least one storage device that stores at least one first recognition dictionary having information pertaining to at least one second arrangement of constituent dots making up at least one second character of at least one second display font and at least one second character size; and
   at least one character recognition unit that searches the at least one first recognition dictionary and identifies the at least one first character by performing at least one first comparison to determine whether the at least one first recognition dictionary contains at least one third character for which information pertaining to at least one third arrangement of constituent dots making up the at least one third character is a perfect match for the at least one first arrangement of constituent dots making up the at least one first character displayed at the at least one display.

2. The character recognition system according to claim 1 further comprising at least one font check unit
   that carries out screen capture to obtain, from at least one video memory, image data pertaining to the at least one first character displayed at the at least one display, and
   that obtains the at least one first display font and the at least one first character size of the at least one first character by performing at least one second comparison to determine whether there is a perfect match with information pertaining to the at least one first arrangement of constituent dots making up the at least one first character;
   wherein the at least one character recognition unit carries out screen capture to obtain, from the at least one video memory, image data pertaining to the at least one first character displayed at the display; and
   wherein the at least one first recognition dictionary that is searched by the at least one character recognition unit is the at least one first recognition dictionary which corresponds to the at least one first display font and the at least one first character size that were obtained by the font check unit.

3. The character recognition system according to claim 1 further comprising at least one dictionary creation unit that creates the at least one first recognition dictionary by obtaining the information pertaining to the at least one second arrangement of constituent dots making up the at least one second character as the at least one second character of the at least one second display font and the at least one second character size are sequentially displayed by way of at least one video memory.

4. The character recognition system according to claim 2 further comprising at least one dictionary creation unit that creates the at least one first recognition dictionary by obtaining the information pertaining to the at least one second arrangement of constituent dots making up the at least one second character as the at least one second character of the at least one second display font and the at least one second character size are sequentially displayed by way of at least one video memory;
  wherein the at least one first recognition dictionary that is created by the at least one dictionary creation unit is the at least one first recognition dictionary which corresponds to the at least one first display font and the at least one first character size that were obtained by the font check unit.

5. The character recognition system according to claim 1 wherein the at least one character recognition unit carries out character recognition by identifying the at least one first display font and the at least one first character size of the at least one first character, and by thereafter searching only the at least one first recognition dictionary which corresponds to the at least one first display font and the at least one first character size that were identified.

6. The character recognition system according to claim 5 wherein the identification of the at least one first display font and the at least one first character size of the at least one first character is carried out by searching at least one second recognition dictionary that is a subset of the at least one first recognition dictionary and that has information pertaining to less characters than the at least one first recognition dictionary.

7. The character recognition system according to claim 6 wherein the at least one second recognition dictionary contains records for substantially all sizes of all fonts installed on the at least one computer but only for check characters.

8. The character recognition system according to claim 6 wherein the at least one second recognition dictionary contains records for not more than five check characters.

9. The character recognition system according to claim 1 wherein
  the information pertaining to the at least one first arrangement of constituent dots is information pertaining to positions for arrangement of dots within at least one first rectangular border containing all constituent dots making up the at least one first character;
  the information pertaining to the at least one second arrangement of constituent dots is information pertaining to positions for arrangement of dots within at least one second rectangular border containing all constituent dots making up the at least one second character; and
  the information pertaining to the at least one third arrangement of constituent dots is information pertaining to positions for arrangement of dots within at least one third rectangular border containing all constituent dots making up the at least one third character.

10. The character recognition system according to claim 9 wherein
  the at least one first rectangular border is a smallest rectangular border which contains all constituent dots making up the at least one first character;
  the at least one second rectangular border is a smallest rectangular border which contains all constituent dots making up the at least one second character; and
  the at least one third rectangular border is a smallest rectangular border which contains all constituent dots making up the at least one third character.

11. The character recognition system according to claim 3 wherein the obtaining of the information pertaining to the at least one second arrangement of constituent dots making up the at least one second character is accomplished by screen capture from the at least one video memory.

12. The character recognition system according to claim 1 wherein the at least one second display font and the at least one second character size within the at least one first recognition dictionary include substantially all sizes of all fonts installed on the at least one computer.

13. The character recognition system according to claim 1 wherein the at least one first recognition dictionary comprises at least one record stored in at least one database.

14. The character recognition system according to claim 13 wherein the at least one record contains information specifying at least one dictionary identifier, the at least one second display font, the at least one second character size, at least one character code, at least one dot arrangement within at least one border, at least one border size, and at least one border position.

15. The character recognition system according to claim 1 wherein the at least one first comparison includes an operation in which at least one third border size of the at least one third character is compared with at least one first border size of the at least one first character.

16. The character recognition system according to claim 1 wherein the at least one first comparison includes an operation in which at least one third border position of the at least one third character is compared with at least one first border position of the at least one first character.

17. A non-transitory computer-readable medium containing at least one character recognition program for causing at least one first character, of at least one first display font and at least one first character size and having at least one first arrangement of constituent dots making up the at least one first character, displayed on at least one display to be recognized by at least one computer, the at least one character recognition program causing the at least one computer to carry out:
  recognition dictionary creation in which at least one first recognition dictionary is created which has information pertaining to at least one second arrangement of constituent dots making up at least one second character of at least one second display font and at least one second character size; and
  character recognition in which the at least one first recognition dictionary is searched, and the at least one first character is identified by performing at least one first comparison to determine whether the at least one first recognition dictionary contains at least one third character for which information pertaining to at least one third arrangement of constituent dots making up the at least one third character is a perfect match for the at least one first arrangement of constituent dots making up the at least one first character displayed at the at least one display.

18. A non-transitory computer-readable medium according to claim 17 wherein the at least one character recognition program further
  further causes the at least one computer to carry out font checking in which screen capture is carried out to obtain, from at least one video memory, image data pertaining to the at least one first character displayed at the at least one display, and the at least one first display font and the at least one first character size of the at least one first character are obtained by performing at least one second comparison to determine whether there is a perfect match with information pertaining to the at least one first arrangement of constituent dots making up the at least one first character;

wherein the character recognition is such that screen capture is carried out to obtain, from the at least one video memory, image data pertaining to the at least one first character displayed at the display; and wherein the at least one first recognition dictionary that is searched during the character recognition is the at least one first recognition dictionary which corresponds to the at least one first display font and the at least one first character size that were obtained during the font checking.

19. A character recognition method for recognizing at least one first character, of at least one first display font and at least one first character size and having at least one first arrangement of constituent dots making up the at least one first character, displayed on at least one display of at least one computer, the character recognition method comprising:

recognition dictionary creation in which at least one first recognition dictionary is created which has information pertaining to at least one second arrangement of constituent dots making up at least one second character of at least one second display font and at least one second character size; and character recognition in which the at least one first recognition dictionary is searched, and the at least one first character is identified by performing at least one first comparison to determine whether the at least one first recognition dictionary contains at least one third character for which information pertaining to at least one third arrangement of constituent dots making up the at least one third character is a perfect match for the at least one first arrangement of constituent dots making up the at least one first character displayed at the at least one display.

20. A character recognition method according to claim 19 further comprising font checking in which screen capture is carried out to obtain, from at least one video memory, image data pertaining to the at least one first character displayed at the at least one display, and the at least one first display font and the at least one first character size of the at least one first character are obtained by performing at least one second comparison to determine whether there is a perfect match with information pertaining to the at least one first arrangement of constituent dots making up the at least one first character;

wherein the character recognition is such that screen capture is carried out to obtain, from the at least one video memory, image data pertaining to the at least one first character displayed at the display; and wherein the at least one first recognition dictionary that is searched during the character recognition is the at least one first recognition dictionary which corresponds to the at least one first display font and the at least one first character size that were obtained during the font checking.

* * * * *